(12) United States Patent
Bates et al.

(10) Patent No.: US 7,675,255 B2
(45) Date of Patent: Mar. 9, 2010

(54) BACK EMF REDUCTION IN A STORAGE DRIVE USING PULSE WIDTH MODULATION IN A CLOSED LOOP MOTOR CONTROL SYSTEM

(75) Inventors: Allen K. Bates, Tucson, AZ (US); Nhan Xuan Bui, Tucson, AZ (US); Reed A. Hancock, Tucson, AZ (US); Louis P. Russo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 11/669,615

(22) Filed: Jan. 31, 2007

(65) Prior Publication Data
US 2008/0180828 A1 Jul. 31, 2008

(51) Int. Cl.
H02P 3/00 (2006.01)
(52) U.S. Cl. .................. 318/375; 318/376; 318/368; 318/273
(58) Field of Classification Search .......... 318/375, 318/376, 273, 293, 368
See application file for complete search history.

(56) References Cited
U.S. PATENT DOCUMENTS

| | | | |
|---|---|---|---|
| 3,566,227 A * | 2/1971 | Edhlund ............. 318/258 |
| 4,065,074 A | 12/1977 | Anderson et al. |
| 4,454,454 A | 6/1984 | Valentine |
| 4,527,103 A * | 7/1985 | Kade ............. 318/293 |
| 4,767,970 A * | 8/1988 | Rodal ............. 318/375 |
| 5,426,355 A | 6/1995 | Zweighaft |
| 6,078,156 A | 6/2000 | Spurr |
| 6,542,324 B1 * | 4/2003 | Galbiati et al. ............. 360/75 |
| 6,754,026 B1 | 6/2004 | Koski |
| 6,819,065 B1 | 11/2004 | Howarth et al. |
| 2004/0155623 A1 * | 8/2004 | Youm ............. 318/801 |

* cited by examiner

*Primary Examiner*—Bentsu Ro
*Assistant Examiner*—Thai Dinh
(74) *Attorney, Agent, or Firm*—William K. Konrad; Konrad Raynes & Victor LLP

(57) ABSTRACT

A storage drive implements a method for a BEMF voltage reduction during a deceleration period of an electric motor of the storage drive. In operation, the electric motor is disconnected from a power supply during an entirety of the deceleration period of the electric motor to prevent any flow of a BEMF current into the power supply, and the electric motor is connected to a power return during a segment or an entirety of the deceleration period of the electric motor to dissipate any BEMF voltage within the electric motor.

17 Claims, 17 Drawing Sheets

| | $HA_{150}$ | $HB_{150}$ | $HC_{150}$ | S1 | S2 | S3 | S4 | S5 | S6 |
|---|---|---|---|---|---|---|---|---|---|
| FORWARD (PWM) | H | L | H | C | O | O | O | O | C |
| | H | L | L | O | C | O | O | O | C |
| | H | H | L | O | C | O | C | O | O |
| | L | H | L | O | O | C | C | O | O |
| | L | H | H | O | O | C | O | C | O |
| | L | L | H | C | O | O | O | C | O |
| REVERSE (PWM) | H | L | H | O | O | C | O | O | O |
| | H | L | L | O | O | C | O | C | O |
| | H | H | L | C | O | O | O | C | O |
| | L | H | L | C | C | O | O | O | C |
| | L | H | H | O | C | O | O | O | C |
| | L | L | H | O | C | O | C | O | O |

FIG. 10
(PRIOR ART)

| | S1 | S2 | S3 | S4 | S5 | S6 |
|---|---|---|---|---|---|---|
| BEMF ACTIVE | O | O | O | C | C | C |
| BEMF INACTIVE | O | O | O | O | O | O |

BACK EMF REDUCTION IN A STORAGE DRIVE USING PULSE WIDTH MODULATION IN A CLOSED LOOP MOTOR CONTROL SYSTEM

FIELD OF THE INVENTION

The present invention generally relates to field of data tape transport devices. The present invention specifically relates to back electromotive force ("BEMF") voltage reduction in a storage drive (e.g., a tape drive).

BACKGROUND OF THE INVENTION

Magnetic tape provides a means for physically storing data. As an archival medium, tape often comprises the only copy of the data. The tape is typically made as thin as practically possible to maximize the length of a tape stored on a tape reel, and thereby maximize the amount of data that can be stored on the tape contained in a single cartridge. A tape drive is used to store and retrieve data with respect to the magnetic tape. While thinner tapes are desired to maximize the amount of tape stored in a single cartridge, thinner tapes are more prone to breakage as a result of mechanical stress or malfunctions of the tape drive. An example of a tape drive is the IBM TotalStorage Enterprise Tape Drive 3592 manufactured by IBM Corporation. Tape drives are typically used in combination with an automated data storage library. For example, the IBM TotalStorage Enterprise Tape Library 3494 manufactured by IBM Corporation is an automated data storage library that may include one or more tape drives and data storage media for storing data with respect to the tape drives.

Tape drives frequently employ DC motors and feedback control systems with motor drivers for operating the DC motors, to produce well controlled motion parameters such as position, velocity, and tape tension. Such control systems are usually very complex, and the feedback control system may compensate for marginal components, hiding latent problems until a catastrophic failure occurs. While the motors rotate, a back EMF ("BEMF") is produced by the tape drive electric motors. This BEMF voltage is produced because the electric motors generate an opposing voltage while rotating. During deceleration, the stored mechanical energy in the rotating motor is prosegmental to the kinetic energy KE, where, $KE = I \times w^2$. Prior art solutions, transfer this stored energy during deceleration to the power supply connected to the tape drive, resulting in the tape drive sending current into the power supply. Because, the energy stored is prosegmental to the square of the tape velocity, a higher performance tape drive has larger BEMF voltage since the BEMF voltage is prosegmental to the rotating speed. Near the beginning and ending of the tape, the motor rotating speeds are highest and result in a larger current driven back into the constant voltage power supply.

BEMF voltage can cause various modes of failure for the tape drive and power supply system. One mode of failure resolved by the present invention involves a BEMF current during a motor deceleration that causes a voltage of a power supply to increase due a lack of sufficient capacitance at the output of the power supply to absorb the incoming BEMF current without increasing the voltage. As a result, the voltage increase may cause the power supply to trip an overvoltage protection circuit that turns off the power supply. For example, a BEMF current flowing into a 12 volt power supply during a motor deceleration can cause an overvoltage protection circuit to turn off the 12 volt power supply as the 12 volt power supply approaches 13.4 volts. What is therefore needed is a technique for reducing, if not eliminating, the BEMF voltage of the electric motor during an electric motor deceleration.

SUMMARY OF THE INVENTION

The present invention provides a new and unique technique for transferring stored energy in a tape reel to a power return during motor deceleration instead of sending the stored energy to a power supply.

A first form of the present invention is a method for a BEMF voltage reduction in a storage drive including an electric motor. The method involves disconnecting the electric motor from a power supply during an entirety of a deceleration period of the electric motor to prevent any flow of a BEMF current into the power supply, and connecting the electric motor to a power return during a segment or an entirety of the deceleration period of the electric motor to dissipate any BEMF voltage within the electric motor.

A second form of the present invention is a storage drive comprising an electric motor and a motor controller. In operation, the motor controller disconnects the electric motor from a power supply during an entirety of a deceleration period of the electric motor to prevent any flow of a BEMF current into the power supply, and connects the electric motor to a power return during a segment or an entirety of the deceleration period of the electric motor to dissipate any BEMF voltage within the electric motor.

A third form of the present invention is an article of manufacture for performing operations to provide a BEMF voltage reduction in a storage drive including an electric motor. The operations involve disconnecting the electric motor from a power supply during an entirety of a deceleration period of the electric motor to prevent any flow of a BEMF current into the power supply, and connecting the electric motor to a power return during a segment or an entirety of the deceleration of the electric motor to dissipate any BEMF voltage within the electric motor.

The aforementioned forms and additional forms as well as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 10 illustrates an exemplary servo control table implemented by a motor commutator illustrated in FIG. 8 as known in the art;

DETAILED DESCRIPTION OF THE PRESENT INVENTION

Figure 1:
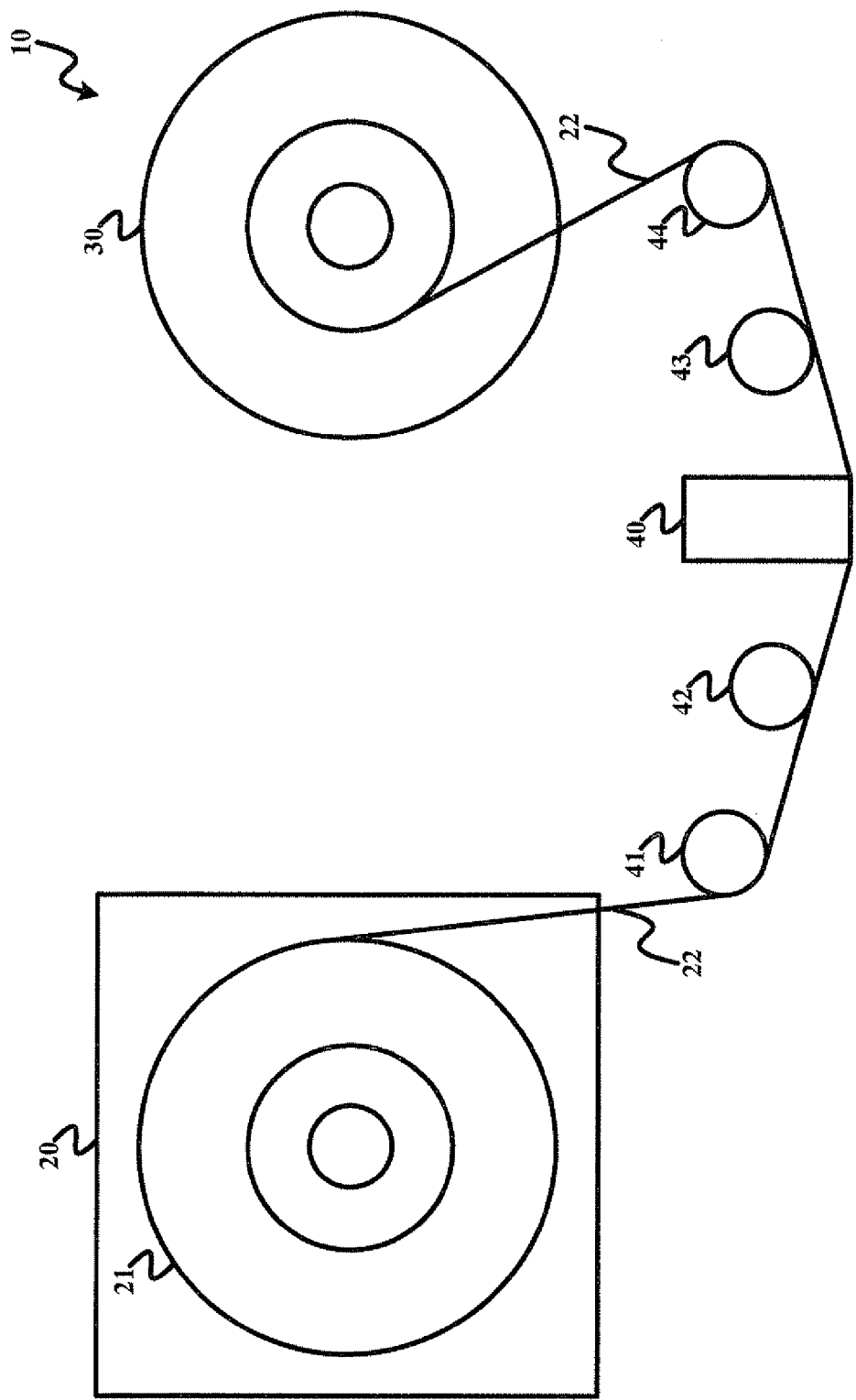
FIG. 1 illustrates a block diagram of a tape path in a tape transport system as known in the art.

FIG. 1 illustrates a tape path of an exemplary tape transport system 10. As illustrated, tape transport system 10 accepts a tape cartridge 20 containing a supply tape reel 21 on which is wound a length of tape 22. Tape transport system 10 includes a take-up tape reel 30, a tape head 40 and guide rollers 41-44. When tape cartridge 20 is inserted into tape transport system 10, tape 22 is automatically threaded around rollers 41-44, across tape head 40 and onto take-up tape reel 30. Motors (not shown) operatively coupled to reels 21 and 30 pull tape 22 across tape head 40, which reads/writes information to/from tape 22 in a known manner. The motors may also move tape 22 from supply tape reel 21 to take-up tape reel 30 at high speed in a fast forward operation or conversely, move tape 22 from take-up reel 30 to supply tape reel 20 at high speed in a rewind operation. The motors may be directly coupled to tape reels 21 and 30 or there may be a mechanical drive system between tape reels 21 and 30 and the motor(s). Whether directly coupled or coupled through a mechanical drive system, the type of coupling determines a mechanical relationship between the motor(s) and tape reels 21 and 30. The mechanical drive system could be, for example, gears, belts, pulleys, clutches, etc.

The type of tape transport system 10 shown in FIG. 1 is for illustrative purposes only and the present invention may be employed with other types of tape transport systems.

Figure 2:
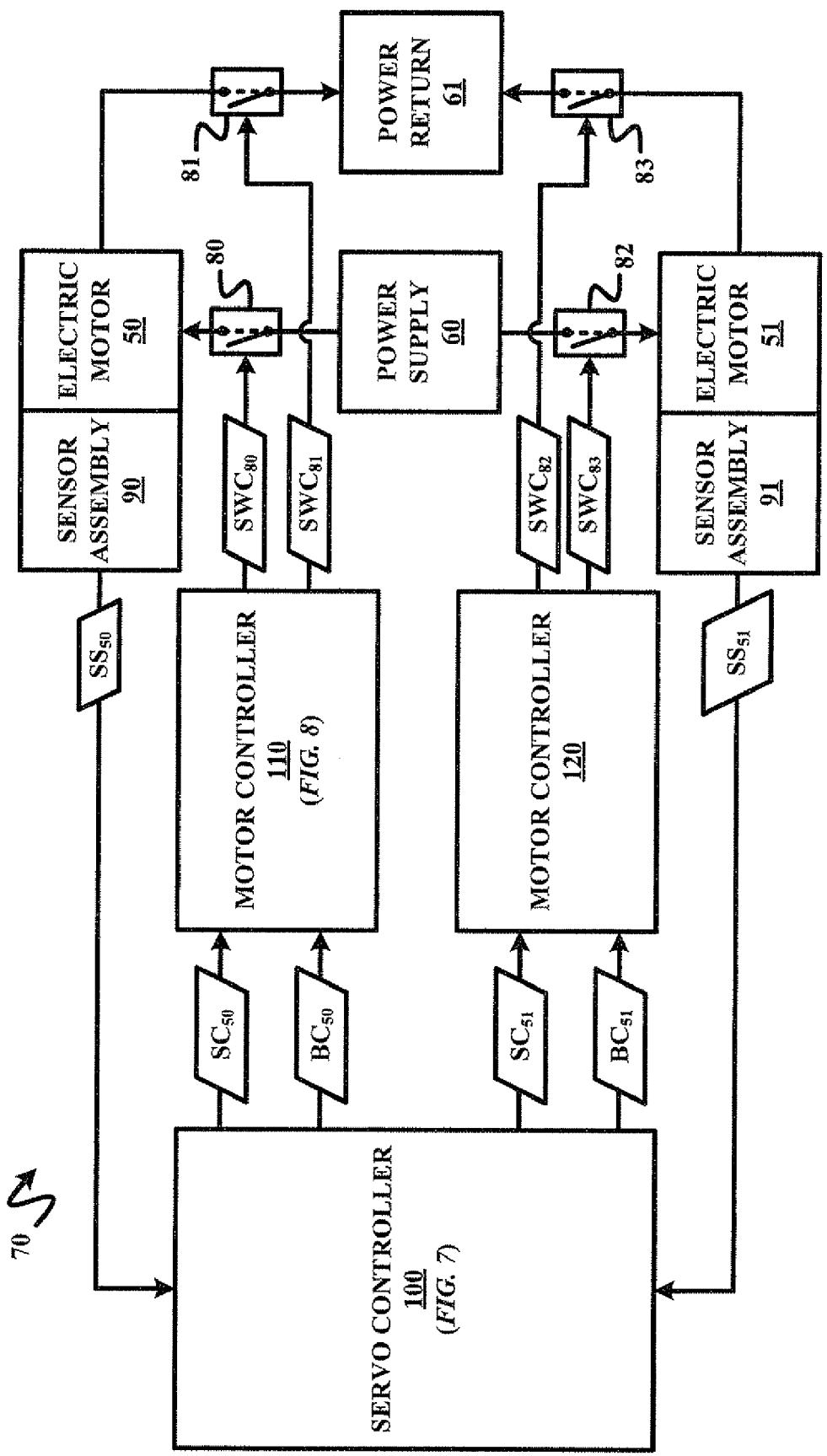
FIG. 2 illustrates a block diagram of one embodiment of a motor control system in accordance with the present invention.

FIG. 2 illustrates a pair of electric motors 50 and 51 for moving tape between tape reels as known in the art, such as, for example, tape reels 21 and 30 shown in FIG. 1. A motor control system 70 employs a supply switch network 80 connected to electric motor 50 and a power supply 60 with supply switch network 80 having an open state as shown by the solid line and a closed state as shown by the dashed line. The open state of supply switch network 80 is broadly defined herein as an operative state of supply switch network 80 for providing one or more current charging paths from power supply 60 to electric motor 50, and the closed state of supply switch network 80 is broadly defined herein as an operative state of supply switch network 80 for disconnecting power supply 60 from electric motor 50. Additionally, a return switch network 81 is connected to electric motor 50 and a power return 61 with return switch network 81 having an open state as shown by the solid line and a closed state as shown by the dashed line. The closed state of return switch network 80 is broadly defined herein as an operative state of return switch network 81 for providing one or more current discharging paths from electric motor 50 to power return 61, and the open state of return switch network 81 is broadly defined herein as an operative state of return switch network 81 for disconnecting electric motor 50 from power return 61.

Similarly, motor control system 70 employs a supply switch network 82 connected to electric motor 51 and power supply 60 with supply switch network 82 having an open state as shown by the solid line and a closed state as shown by the dashed line. The open state of supply switch network 82 is broadly defined herein as an operative state of supply switch network 82 for providing one or more current charging paths from power supply 60 to electric motor 51, and the open state of supply switch network 82 is broadly defined herein as an operative state of supply switch network 82 for disconnecting power supply 60 from electric motor 51. Additionally, a return switch network 83 is connected to electric motor 51 and power return 61 with return switch network 83 having an open state as shown by the solid line and a closed state as shown by the dashed line. The closed state of return switch network 83 is broadly defined herein as an operative state of return switch network 83 for providing one or more current discharging paths from electric motor 51 to power return 61, and the open state of return switch network 83 is broadly defined herein as an operative state of return switch network 83 for disconnecting electric motor 51 from power return 61.

The present invention is premised on switching networks 80-83 between open states and closed states in a manner that minimizes, if not eliminates, any BEMF energy with electric motors 50 and 51. To this end, a motor control system 70 shown in FIG. 2 further employs a sensor assembly 90, a sensor assembly 91, a servo controller 100, a motor controller 110 and a motor controller 120. Sensor assembly 90 is positioned relative to electric motor 50 and structurally configured to sense a tape reel rotational direction and a tape reel angular rotation of a tape reel being driven by electric motor 50. Similarly, sensor assembly 91 is positioned relative to electric motor 51 and structurally configured to sense a tape reel rotational direction and a tape reel angular rotation of a tape reel being driven by electric motor 51. Sensor assemblies 90 and 91 communicates respective sensing signals $SS^{50}$ and $SS^{51}$ to servo controller as indications of the tape reel rotational directions and tape reel angular rotations of tape reels being driven by respective electric motors 50 and 51.

Figure 3:
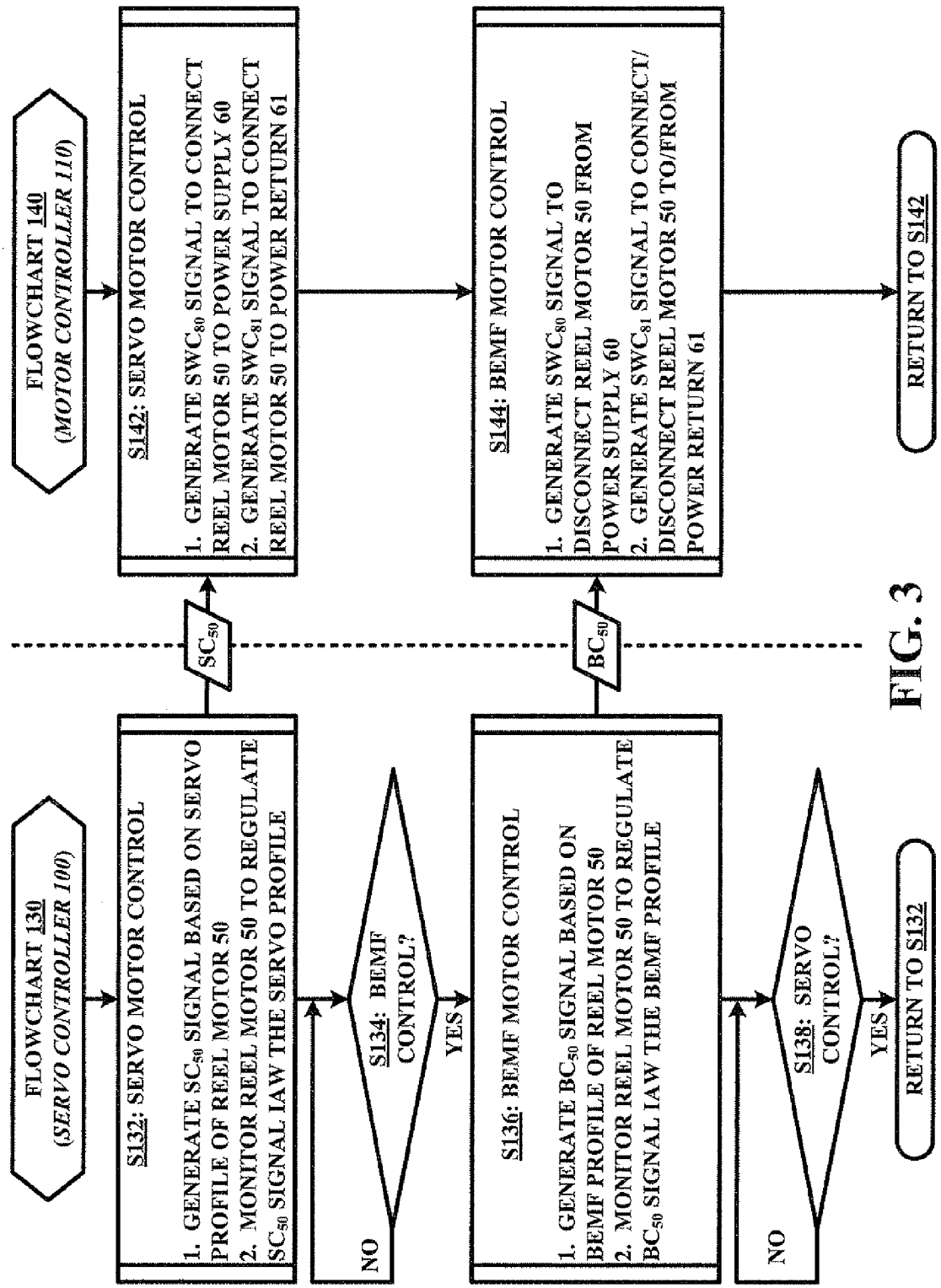
FIG. 3 illustrates flowcharts representative of a first embodiment of a BEMF voltage reduction motor control method in accordance with the present invention.

Servo controller 100 is structurally configured to decode the sensing signals $SS_{50}$ and $SS_{51}$ to thereby provide motor control signals to motor controllers 110 and 120 in view of a rotation direction, velocity and acceleration of tape reels being driven by electric motors 50 and 51. In response thereto, motor controllers 110 and 120 provide switch control signals to respective networks 80-83 in view of switching networks 80-83 between their open states and closed states in a manner to achieve a desired operation of respective motors 50 and 51. To this end, servo controller 100 and motor controllers 110 and 120 implement respective flowcharts 130 and 140 as illustrated in FIG. 3, which are representative of a BEMF voltage reduction motor control method of the present invention. To facilitate an understanding of the present invention, flowcharts 130 and 140 will now be described herein in the context of servo controller 100 and motor controller 110. Nonetheless, those having ordinary skill in the art will appreciate an implementation of flowcharts 130 and 140 in the context of servo controller 100 and motor controller 120.

Referring to FIG. 3, under an initial servo control of electric motor 50 (FIG. 2) during a stage S132 of flowchart 130, servo controller 100 generates a servo control signal $SC_{50}$ based on a servo profile associated with electric motor 50 and monitors electric motor 50 to adjust servo control signal $SC_{50}$ in accordance with the servo profile. In one embodiment, servo control signal $SC_{50}$ is generated and regulated by servo controller 100 in accordance with U.S. patent application Ser. No. 10/223,967 entitled "Direction Detection And Count Method For Three Channel Commutation Sensor" and filed Aug. 8, 2002, by the assignee of the present invention, the entirety of which is hereby incorporated by reference (hereinafter the "Servo Control Reference").

Figure 4:
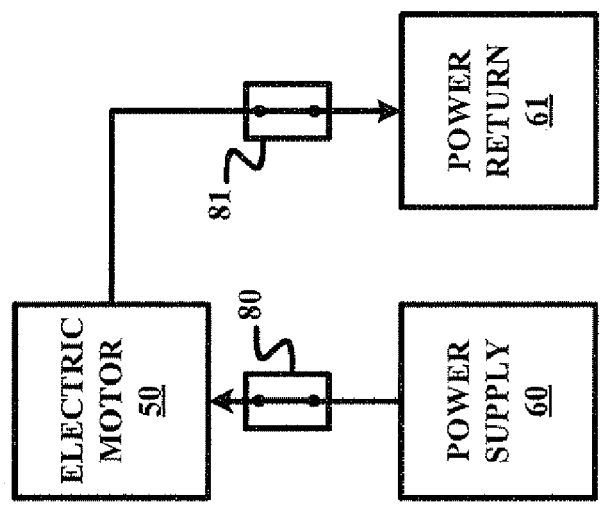

In response thereto, during a stage S142 of flowchart 140, motor controller 110 generates switch control signal $SWC_{80}$ to connect electric motor 50 to power supply 60 by switching supply switch network 80 to its closed state as shown in FIG. 4. Additionally, motor controller 110 generates switch control signal $SWC_{81}$ to connect electric motor 50 to power return 61 by switching return switch network 81 to its closed state as shown in FIG. 4. Additionally, switch networks 80 and 81 are operated within their closed states in a manner that achieves a desired servo operation of electric motor 50 as indicated by servo control signal $SC_{50}$.

Upon servo controller 100 ascertaining a need to decelerate electric motor 50 during a stage S134 of flowchart 130, servo controller 100 proceeds to a stage S136 of flowchart 130 to generate a BEMF control signal $BC_{50}$ based on a BEMF profile associated with electric motor 50 and monitors electric motor 50 to regulates BEMF control signal $SC_{50}$ in accordance with the BEMF profile. In one exemplary embodiment, the BEMF profile provides a desired decelerated velocity of electric motor 50 and servo controller 100 regulates BEMF control signal $BC_{50}$ in view of a comparison of a desired decelerated velocity of electric motor 50 and an actual decelerated velocity of electric motor 50 as indicated by sensing signal $SS_{50}$.

Figure 6:
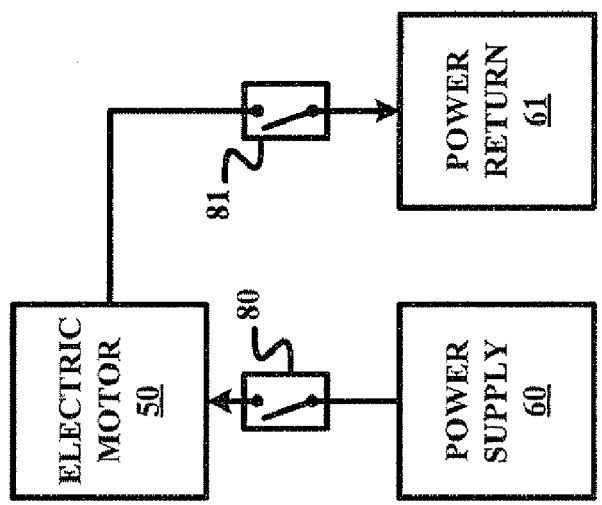
FIGS. 4-6 illustrate block diagrams of various states of switch networks illustrated in FIG. 2 in accordance with the present invention.
Figure 5:
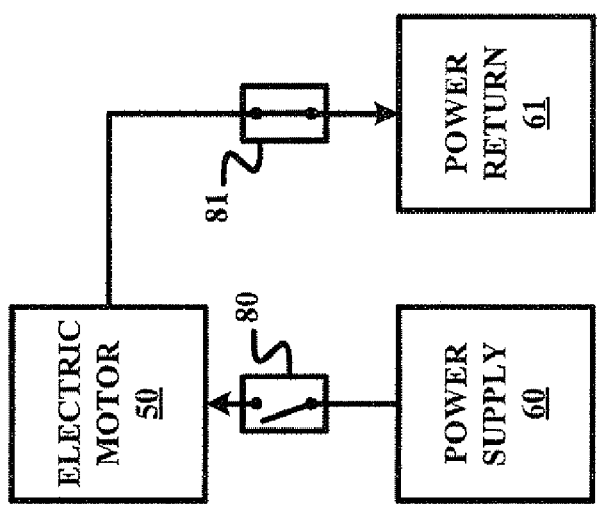

In response thereto, during a stage S144 of flowchart 140, motor controller 110 generates switch control signal $SWC_{80}$ to disconnect electric motor 50 to power supply 60 by switching supply switch network 80 to it open state as shown in FIGS. 5 and 6. Additionally, based on BEMF control signal $BC_{50}$, motor controller 110 generates switch control signal $SWC_{81}$ to connect electric motor 50 to power return 61 by switching return switch network 81 to its closed state as shown in FIG. 5 or alternatively to disconnect electric motor 50 from power return 61 by switching return switch network 81 to its open state as shown in FIG. 6. In one exemplary embodiment, motor controller 110 generates switch control signal $SWC_{81}$ to connect electric motor 50 to power return 61 based on BEMF control signal $BC_{50}$ indicating the desired decelerated velocity of electric motor 50 is less than the actual decelerated velocity of electric motor 50, and alternatively generates switch control signal $SWC_{81}$ to disconnect electric motor 50 from power return 61 based on BEMF control signal $BC_{50}$ indicating the desired decelerated velocity of electric motor 50 is greater than the actual decelerated velocity of electric motor 50.

Servo controller 100 and motor controller 110 return to respective stages S132 and S142 upon servo controller 100 ascertaining a need to return to a servo control of electric motor 50.

In practice, the present invention does not impose any limitations nor any restrictions to the structural configurations of the various components of motor control system 70 (FIG. 2) primarily in view of the fact the structural configurations of the various components of motor control system 70 are dependent to some degree upon the type of electric motor being controlled by motor control system 70 as would be appreciated by those having ordinary skill in the art. Nonetheless, to facilitate further understanding of the present invention, exemplary embodiments of servo controller 100 (FIG. 2) and motor controller 110 (FIG. 2) in view of a winding based electric motor will described herein in connection with FIGS. 7-16.

Figure 7:
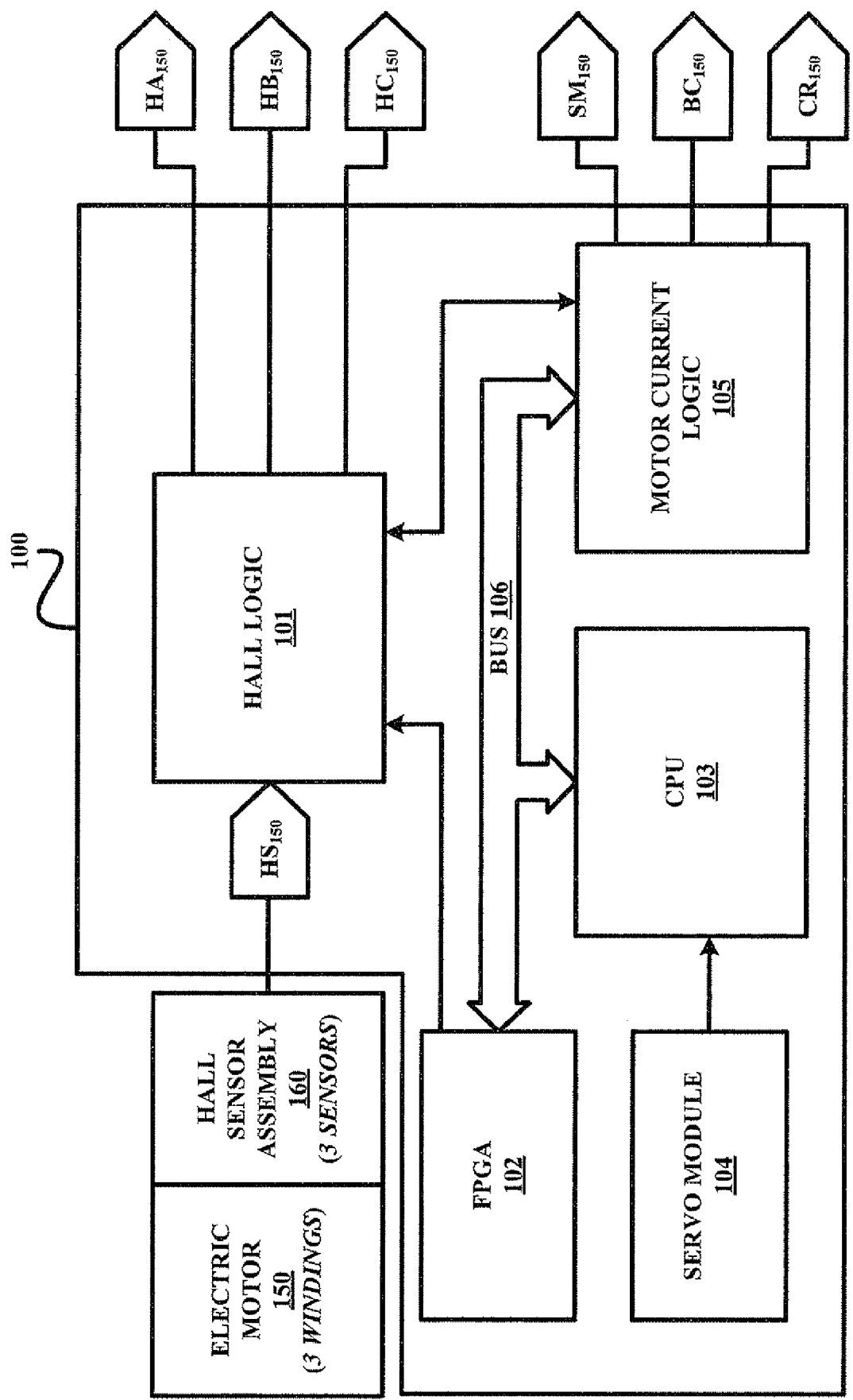
FIG. 7 illustrates a block diagram of one embodiment of a servo controller of the motor control system illustrated in FIG. 2 in accordance with the present invention.

Specifically, FIG. 7 illustrates an embodiment of servo controller 100 (FIG. 2) employing a Hall logic 101, a FPGA 102, a CPU 103 having a servo module 104 microcode therein and a motor current logic 105. Hall logic 101 receives Hall sensing signals $HS_{150}$ from three (3) Hall sensors of a Hall sensor assembly 190 sensing rotation direction and velocity of a tape reel motored by an electric motor 150 having three (3) interconnected motor windings ("MW") 151-153 shown in FIG. 11. Hall logic 101 decodes Hall sensing signals $HS_{150}$ into signals Hall sensing signals $HA_{150}$, $HB_{150}$ and $HC_{150}$ for facilitating an implementation of the Servo Control Reference by servo module 104 as executed by CPU 103 via a bus 106.

Figure 8:
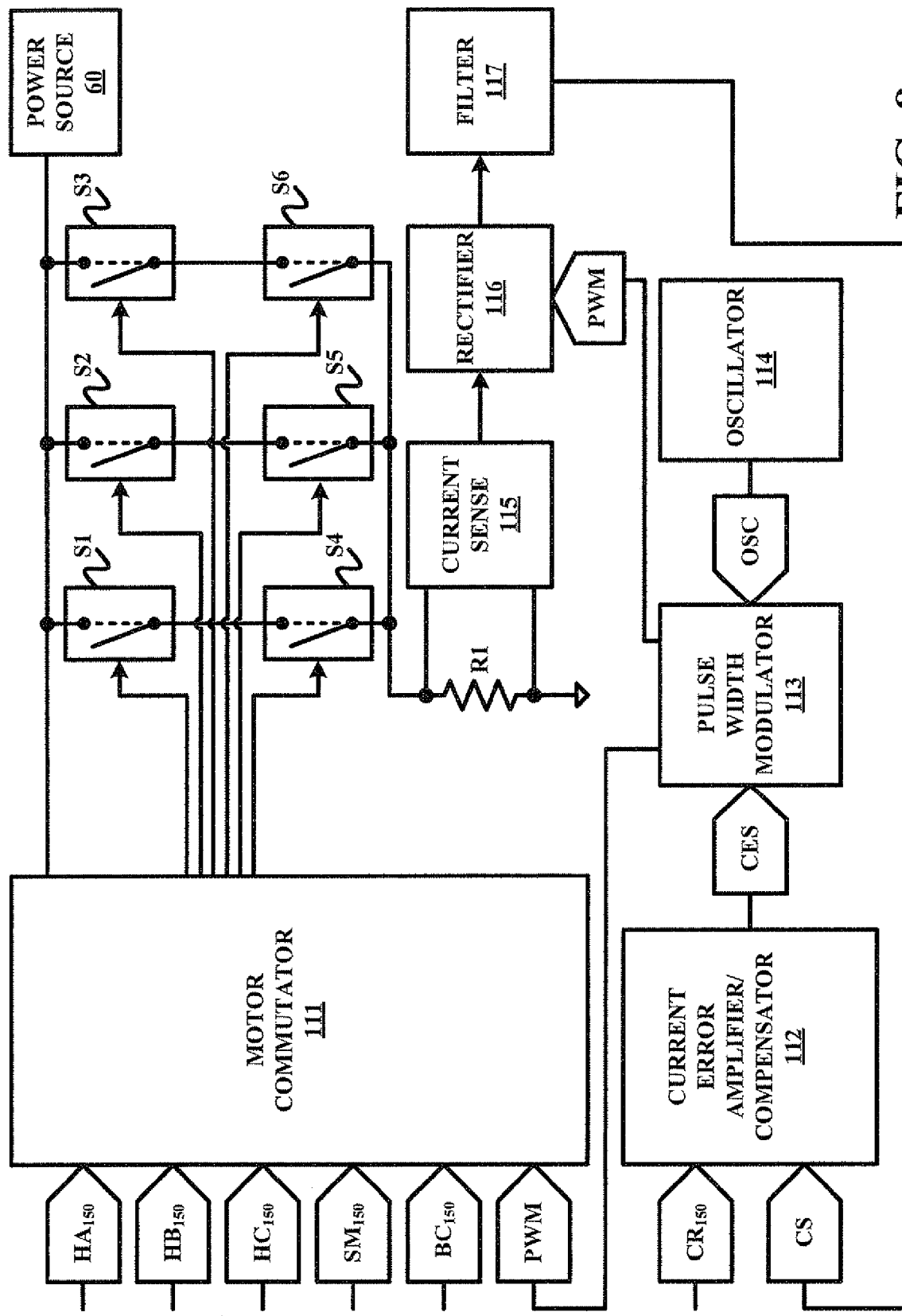
FIG. 8 illustrates a block diagram of one embodiment of a motor controller of the motor control system illustrated in FIG. 2 in accordance with the present invention.
Figure 11:
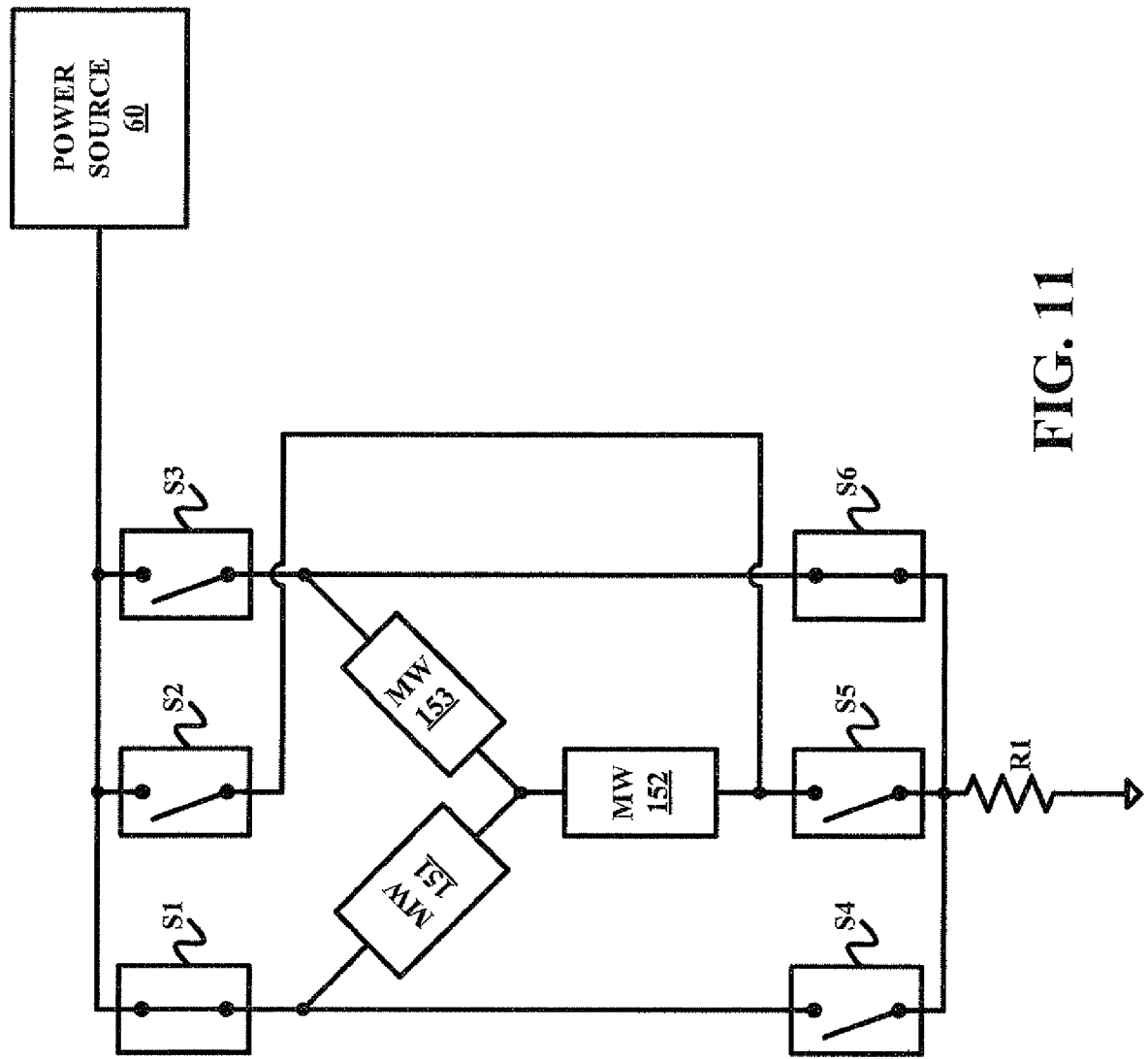
FIGS. 11-16 illustrate block diagrams of various states of driver switches shown in FIG. 8 in accordance with the table illustrated in FIG. 10.
Figure 12:
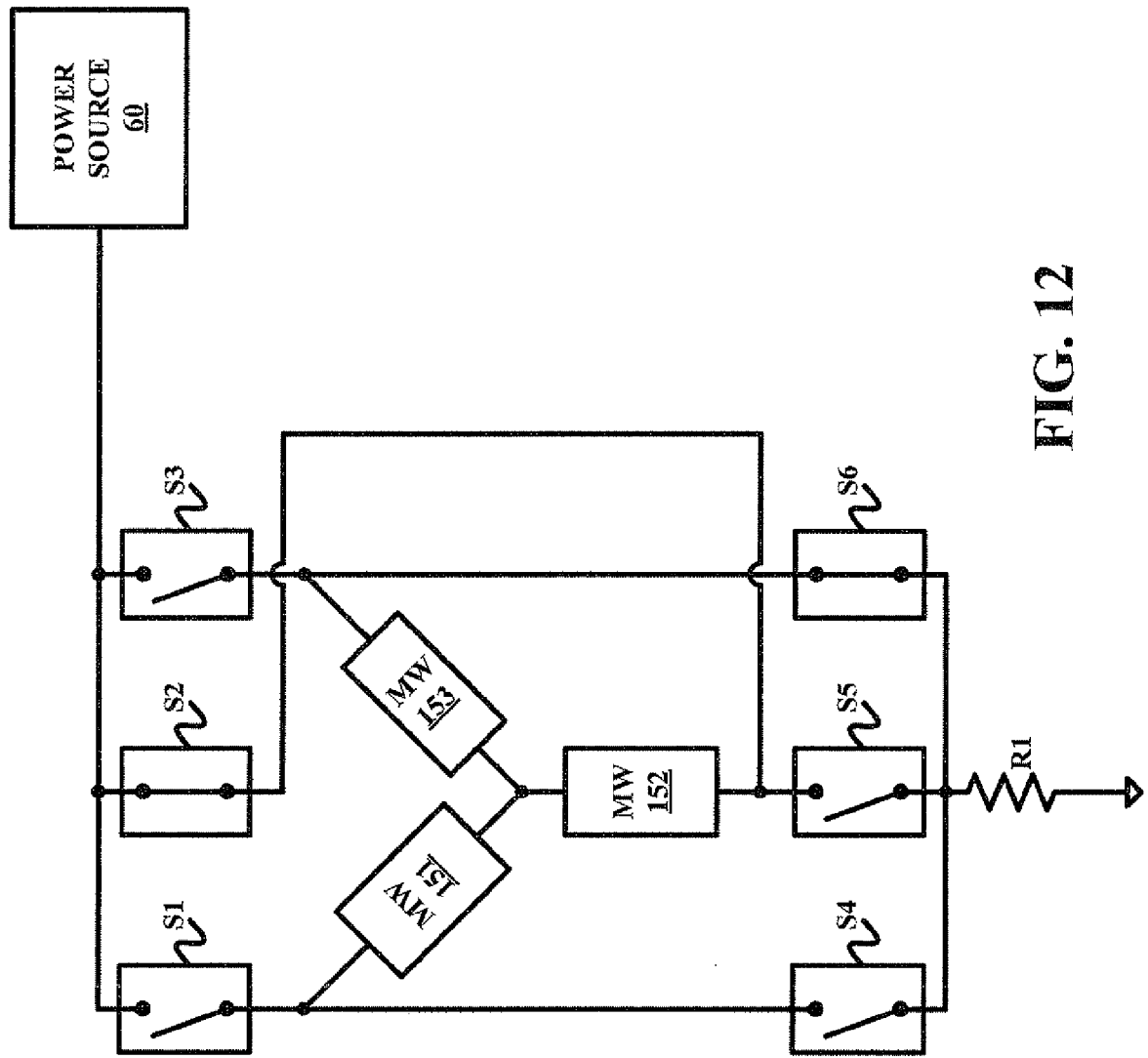
Figure 13:
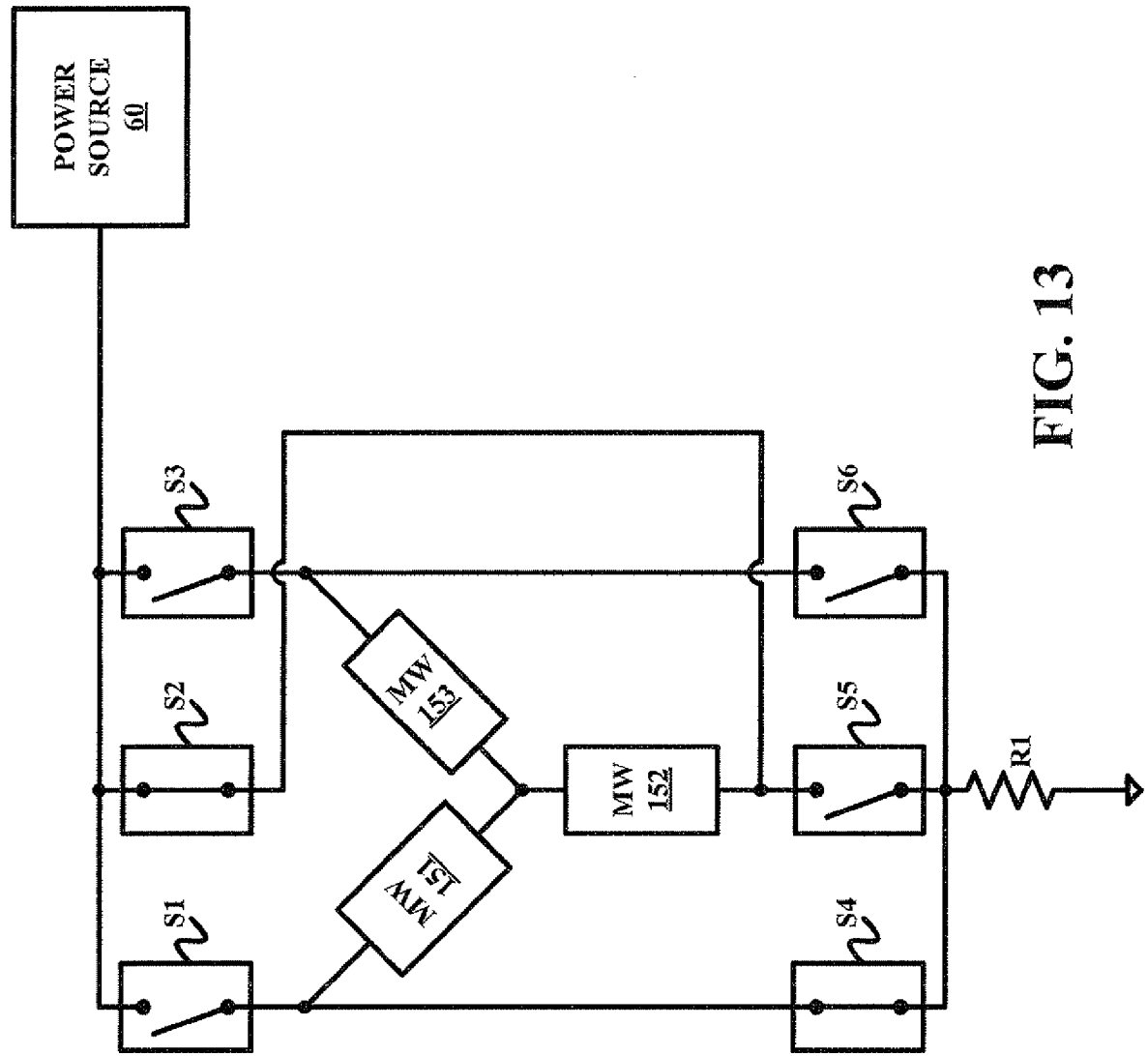
Figure 14:
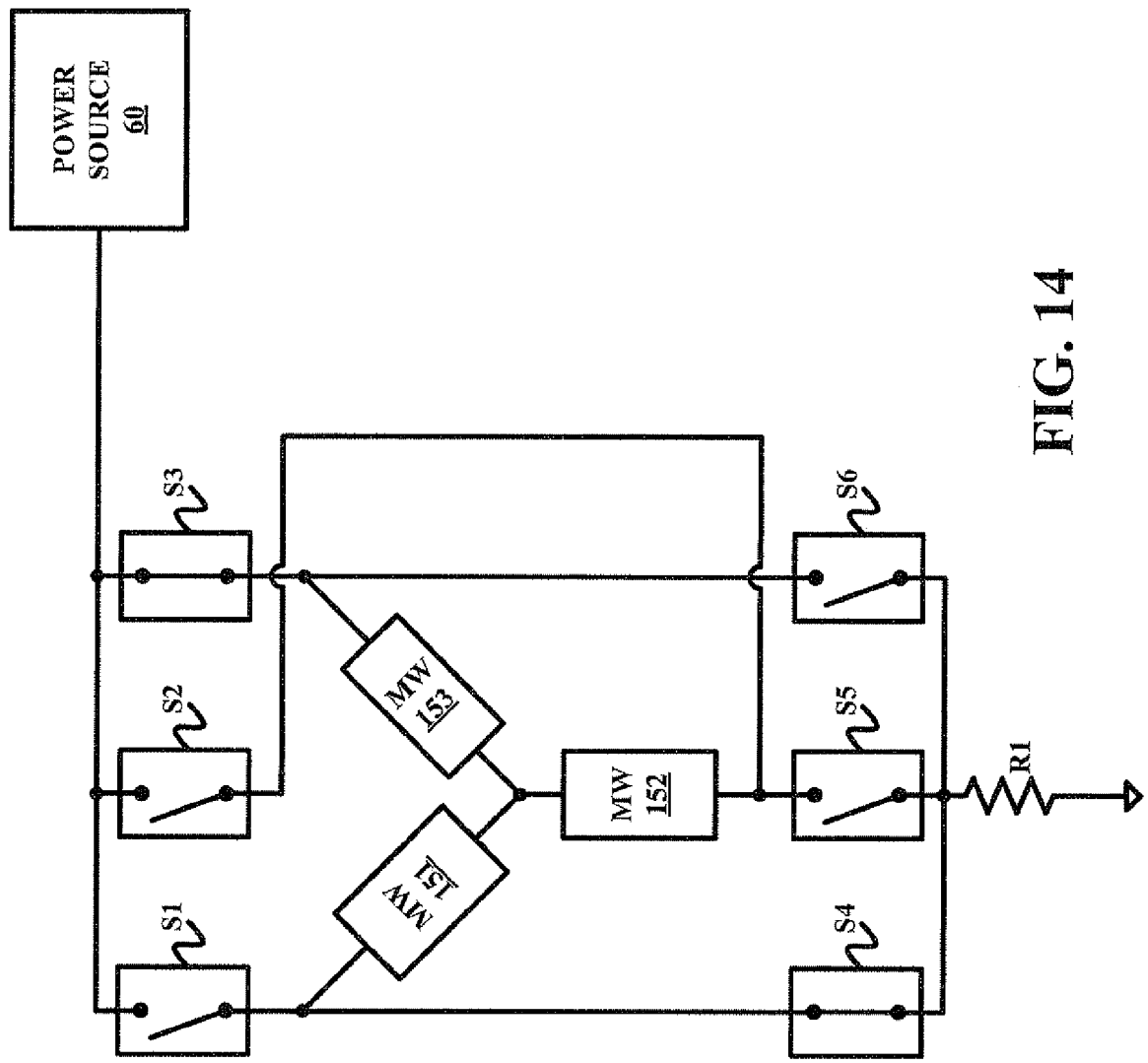
Figure 15:
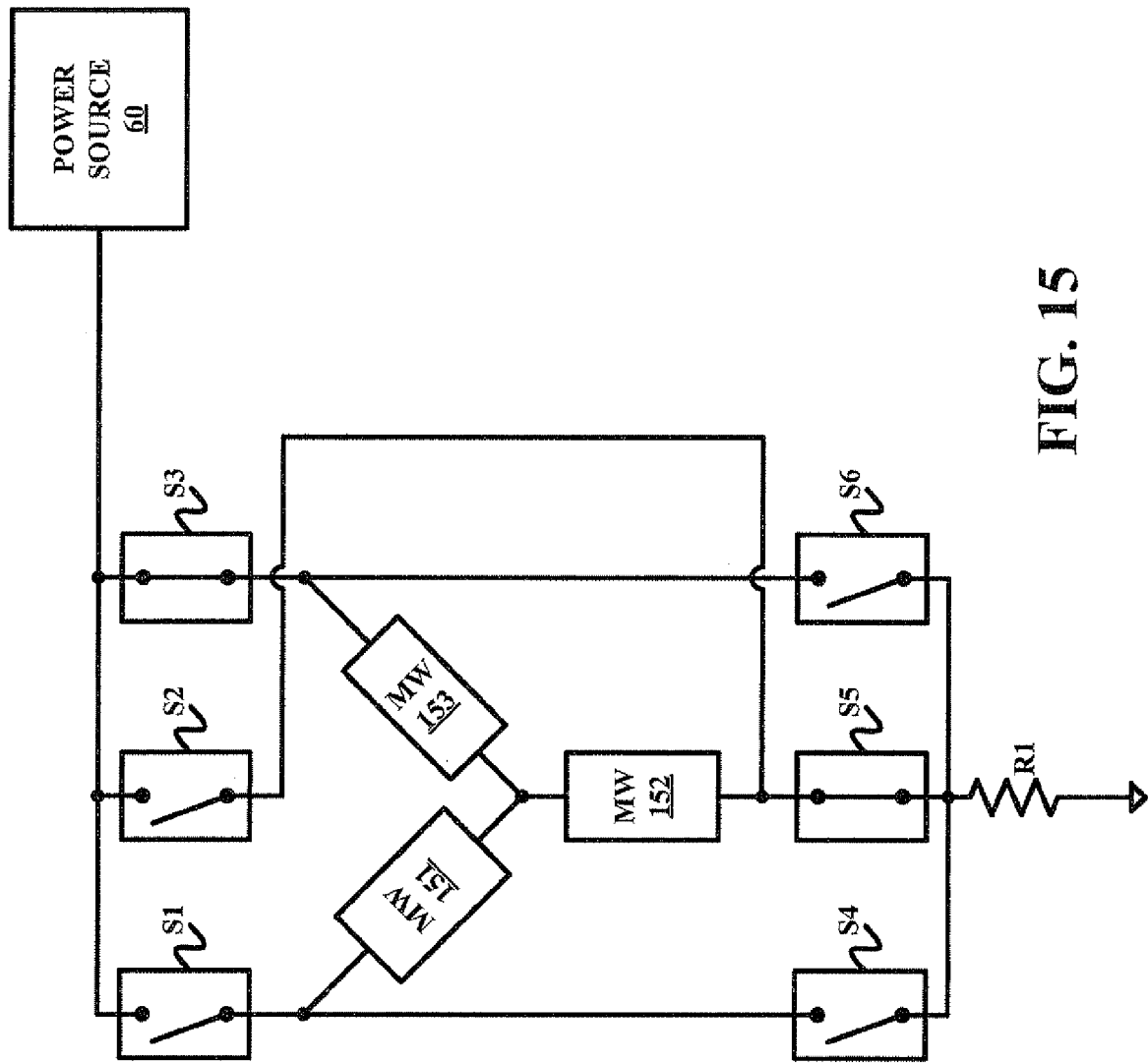
Figure 16:
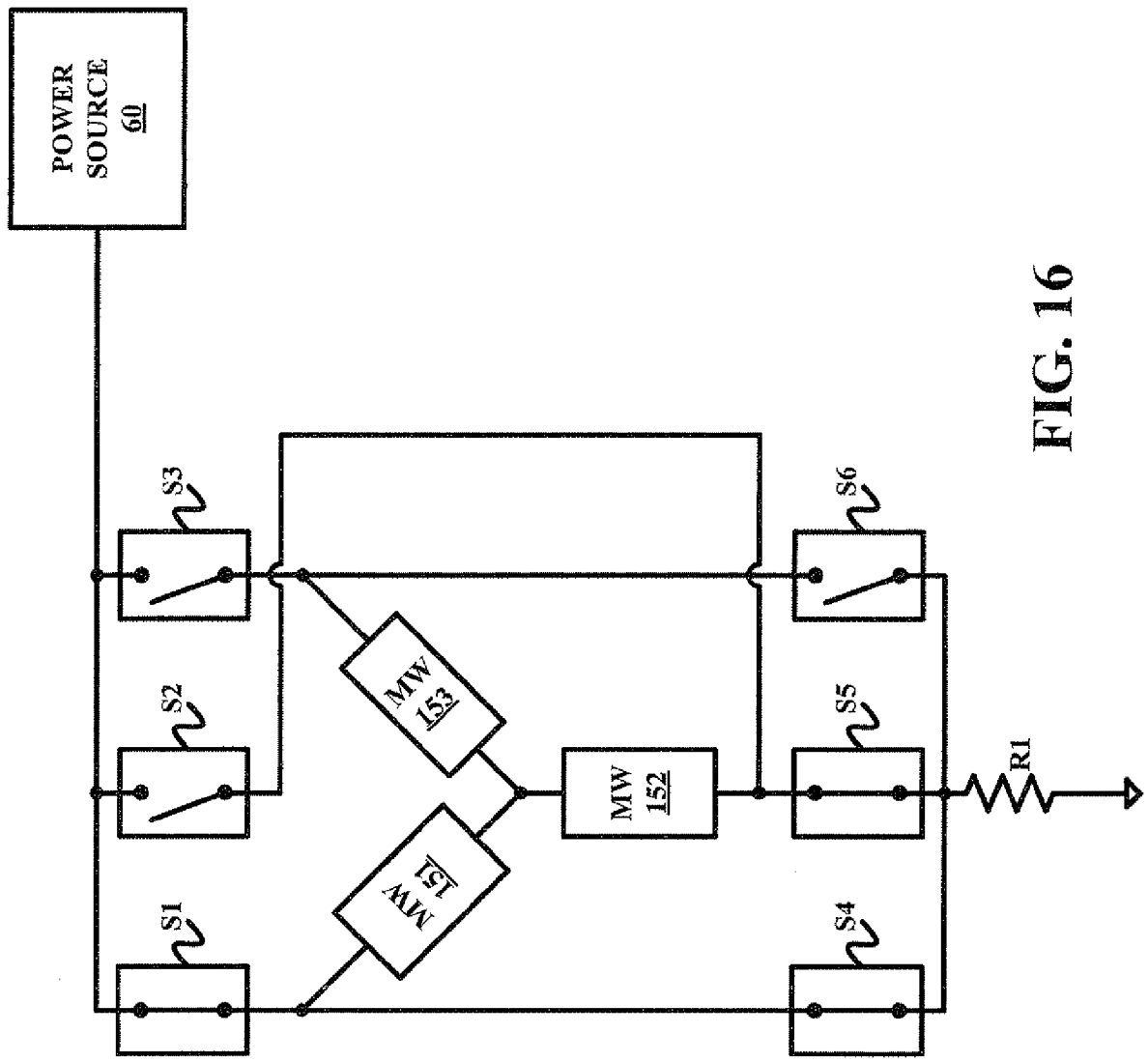

FIG. 8 illustrates an embodiment of motor controller 110 (FIG. 2) employing a motor commutator 111, a current reference amplifier/compensator 112, a pulse width modulator 113, an oscillator 114, a current sense 115, a rectifier 116 and a filter 117. Also shown is a supply switch network consisting of three (3) "H" driver switches S1-S3 connected to power source 60 and a return switch network consisting of three (3) "H" drive switches S4-S6 connected to a resistor R1 serving as a power return. As shown in FIG. 11, driver switches S1 and S4 are further connected to motor winding 151, driver switches S2 and S5 are connected to motor winding 152, and driver switches S3 and S6 are connected to motor winding 153.

Motor commutator 111 is connected to control terminals (not shown) of driver switches S1-S6 to control a switching of each driver switch S1-S6 between an open state and a close state. The supply switch network is deemed to be in closed state in response to one or more of driver switches S1-S3 being closed by motor commutator 111 as indicated by the dashed lines, and in an open state in response to all of driver switches S1-S3 being simultaneously opened by motor commutator 111 as indicated by the solid lines. Similarly, the return switch network is deemed to be in a closed state in response to one or more of driver switches S4-S6 being closed by motor commutator 111 as indicated by the dashed lines, and in an open state in response to all of driver switches S4-S6 being simultaneously opened by motor commutator 111 as indicated by the solid lines.

Figure 9:
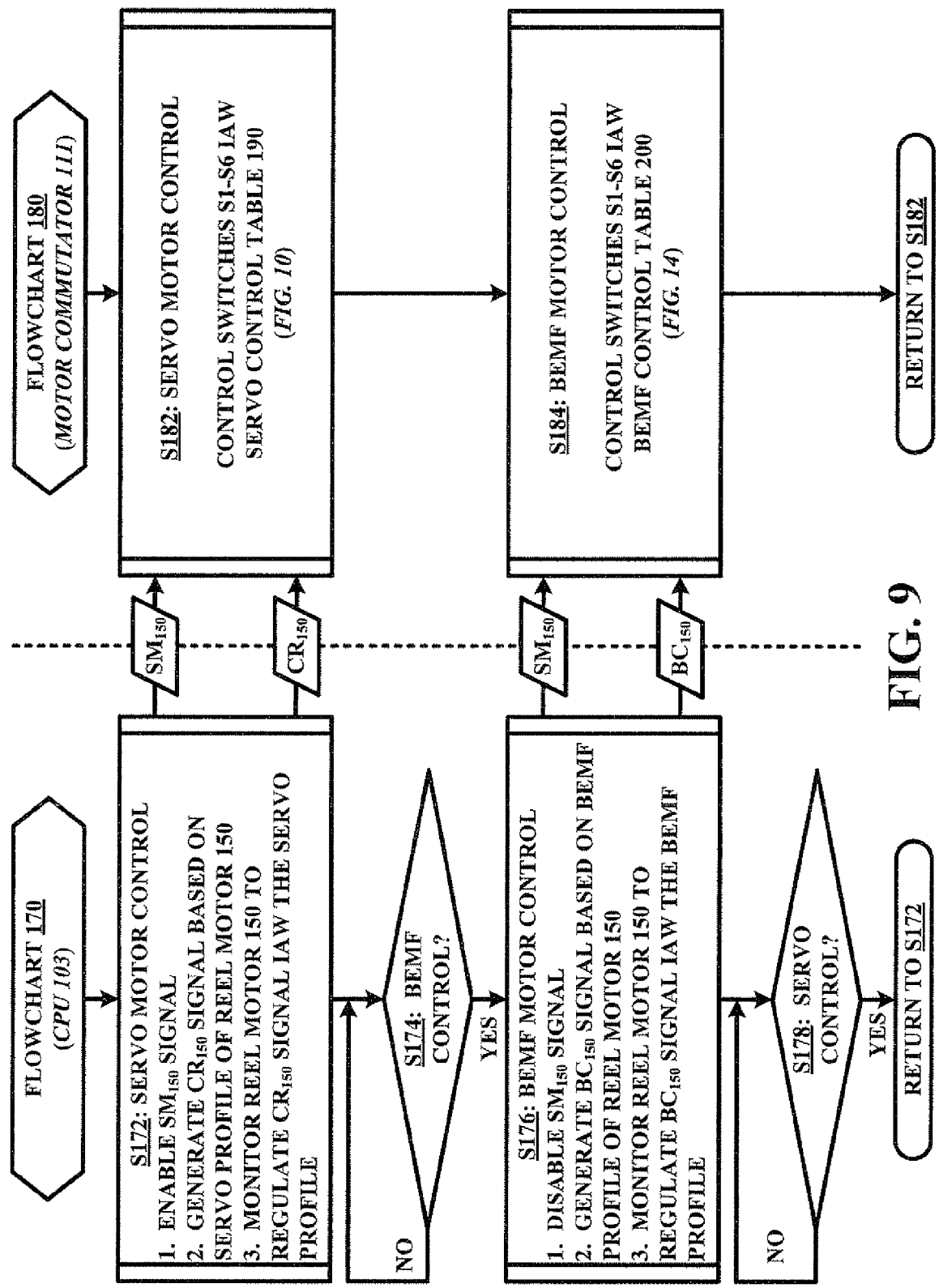
FIG. 9 illustrates flowcharts representative of a second embodiment of a BEMF voltage reduction motor control method in accordance with the present invention.

CPU 103 and motor commutator 111 implement a BEMF motor control method of the present invention as represented by respective flowcharts 170 and 180 shown in FIG. 9.

Referring to FIG. 9, under an initial servo control of electric motor 150 (FIG. 7) during a stage S172 of flowchart 170, CPU 103 directs motor current logic 105 to (1) enable a servo mode control signal $SM_{150}$, (2) to generate a current reference signal $CR_{150}$ based on a servo profile associated with electric motor 150, and (3) to monitor electric motor 150 to adjust current reference signal $CR_{150}$ in accordance with the servo profile. In one embodiment, current reference signal $CR_{150}$ is generated and regulated by CPU 103 in accordance the "Servo Control Reference as executed by servo module 104.

In response thereto, during a stage S1182 of flowchart 180, motor commutator 111 controls drivers switches S1-S6 in accordance with a servo control table 190 illustrated in FIG. 10. Specifically, referring to FIG. 8, current sense 115, rectifier 116 and filter 117 generates a current sense signal $CS_{R1}$ indicative of a current flow through resistor R1. In response thereto, current error amplifier/compensator 112 generates a current error signal CES indicative of a comparison of current reference signal $CR_{150}$ and current sense signal $CS_{R1}$. Concurrently, oscillator 114 provides an oscillation signal OSC to pulse width modulator 113 whereby pulse width modulator 113 generates a pulse width modulation signal PWM having a basic pulse width defined by oscillation signal OSC and modulated as a function of current error signal CES.

For a forward direction, motor commutator 111 controls driver switches S1-S6 as shown in FIGS. 11-16 between their open (O) and closed (C) states in accordance with table 190 as a function of logic high (H) and logic low (L) levels of Hall sensing signals $HA_{150}$, $HB_{150}$ and $HC_{150}$ in view of attaining a desired servo velocity based on pulse width modulation signal PWM. Similarly, for a reverse direction of electric motor 151, motor commutator 111 drives switches S1-S6 between their open (O) and closed (C) states in accordance with table 190 as a function of logic high (H) and logic low (L) levels of Hall sensing signals $HA_{150}$, $HB_{150}$ and $HC_{150}$ in view of attaining a desired servo velocity based on pulse width modulation signal PWM. As such, CPU 103 is capable of regulating current reference signal $CR_{150}$ to attain a desired servo control of electric motor 150.

Upon CPU 103 ascertaining a need to decelerate electric motor 150 during a stage S174 of flowchart 170, CPU 103 proceeds to a stage S176 of flowchart 170 to direct motor current logic 105 to (1) disable servo mode control signal $SM_{150}$, (2) to generate a BEMF control signal $BC_{150}$ based on a BEMF profile associated with electric motor 150 and (3) to monitor electric motor 150 to regulate BEMF control signal $BC_{150}$ in accordance with the BEMF profile. In one exemplary embodiment, the BEMF profile provides a desired decelerated velocity of electric motor 150 and motor control logic 105 regulates BEMF control signal $BC_{150}$ in view of a comparison of a desired decelerated velocity of electric motor 150 and an actual decelerated velocity of electric motor 150 as indicated by Hall sensing signals $HA_{150}$, $HB_{150}$ and $HC_{150}$. BEMF control signal $BC_{150}$ has an active state as an indication that the desired decelerated velocity of electric motor 150 is less than the actual decelerated velocity of electric motor 150, and an in active state as an indication that the desired decelerated velocity of electric motor 150 is greater than the actual decelerated velocity of electric motor 150. For instances where the desired decelerated velocity of electric motor 150 equals the actual decelerated velocity of electric motor 150, BEMF control signal $BC_{150}$ may be set to have either an active state or an inactive state, or alternatively, a hysteresis may be applied to BEMF control signal $BC_{150}$.

Figure 17:
FIG. 17 illustrates an exemplary BEMF control table implemented by a motor commutator illustrated in FIG. 8 in accordance with the present invention.
Figure 18:
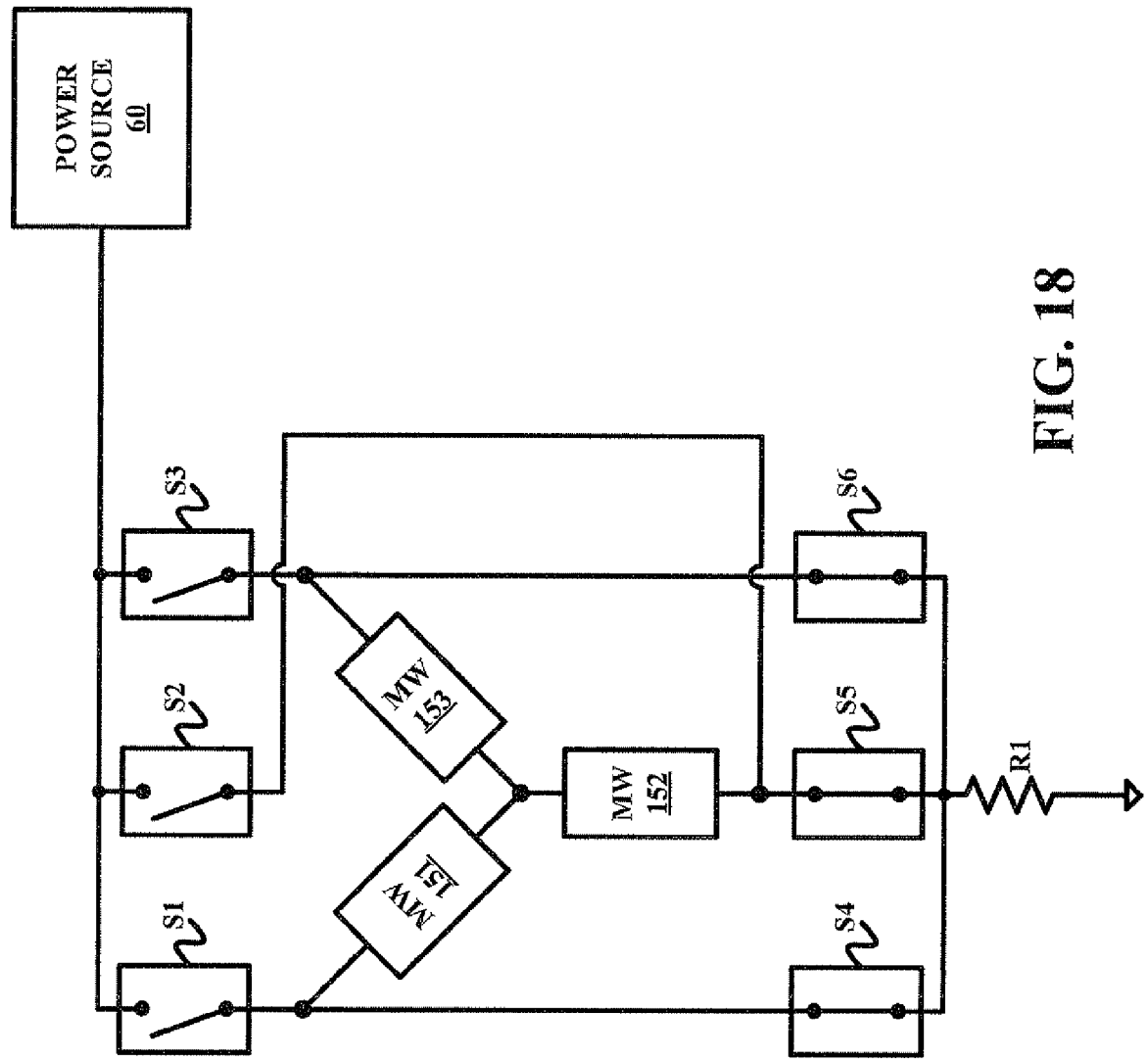
FIGS. 18 and 19 illustrate block diagrams of various states of driver switches shown in FIG. 8 in accordance with the table illustrated in FIG. 17.
Figure 19:
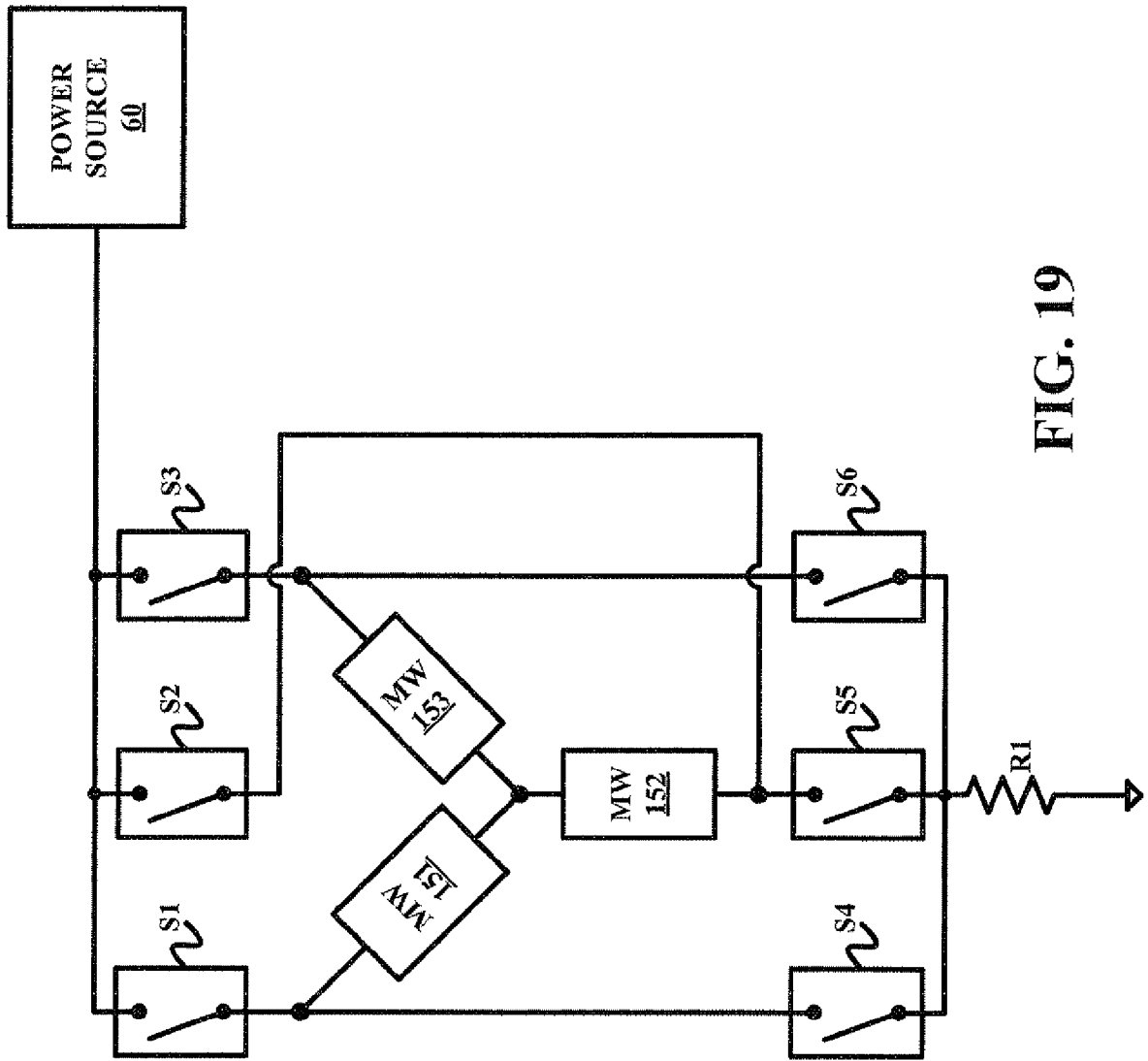

In response thereto, during a stage S184 of flowchart 180, motor commutator 111 controls driver switches S1-S6 in accordance with a BEMF control table 200 illustrated in FIG. 17. Specifically, motor commutator 111 controls opens driver switches S1-S3 as shown in FIG. 18 and closes driver switches S4-S6 as shown in FIG. 18 in accordance with table 200 as a function of BEMF control signal $BC_{150}$ having an active state. Conversely, motor commutator 111 controls opens driver switches S1-S6 as shown in FIG. 19 in accordance with table 200 as a function of BEMF control signal $BC_{150}$ having an inactive state. As such, CPU 103 is capable of toggling BEMF control signal $BC_{150}$ between the active and inactive states as needed to attain a desired deceleration of electric motor 150.

CPU 103 and motor commutator 111 return to respective stages S172 and S182 upon CPU 103 ascertaining a need to return to a servo control of electric motor 150.

Referring to FIGS. 2-19, those having ordinary skill in the art will appreciate numerous benefits and advantages of the present invention including, but not limited to, a minimization, if not elimination of any BEMF energy of an electric motor being applied to a power source. Those having ordinary skill in the art will further appreciate how to apply the inventive principles of the present invention as related to electric motors of any type (e.g., motor windings), to sensor assemblies of any type (e.g., Hall sensors), and to switch networks of any types (e.g., "H" driver switches).

Additionally, the invention disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Those having ordinary skill in the art may develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or segments thereof, it being recognized that the scope of the invention is defined and limited only by the claims which follow.

We claim:

1. A method for a BEMF voltage reduction in a storage device including an electric motor, the method comprising:
    selectively coupling by a motor controller, a winding power output of a plurality of winding power outputs of a power supply to an associated winding of an electric motor of a storage device during a servo operation period of said electric motor;
    disconnecting by the motor controller, all of the windings of the electric motor from all of the winding power outputs of the power supply during an entirety of a deceleration period of the electric motor to prevent any flow of a BEMF current into the winding power outputs of the power supply;
    providing by a servo controller in electrical communication with the motor controller, a BEMF control signal to the motor controller during the entirety of the deceleration period of the electric motor, wherein the BEMF control signal is representative of a comparison of a desired decelerated velocity profile of the electric motor and an actual decelerated velocity of the electric motor;
    connecting by the motor controller, at least one winding of the electric motor to a power return during at least a first segment of the deceleration period of the electric motor based on the BEMF control signal, to dissipate any BEMF voltage within the at least one winding of the electric motor; and disconnecting by the motor controller, the electric motor windings from the power return during a second segment of the deceleration period of the electric motor based on the BEMF control signal.

2. The method of claim 1, wherein the disconnecting of the electric motor windings from the power supply during the entirety of the deceleration period of the electric motor includes:
switching a supply switch network connected to the electric motor windings and winding power outputs of the power supply to an open state during the entirety of the deceleration period of the electric motor.

3. The method of claim 1, wherein the connecting of the at least one winding of the electric motor to the power return during the at least the first segment of the deceleration period of the electric motor includes:
switching a return switch network connected to the electric motor windings and the power return to a closed state during the at least the first segment of the deceleration period of the electric motor.

4. The method of claim 1, wherein the connecting of the at least one winding of the electric motor to the power return during the at least the first segment of the deceleration period of the electric motor includes:
switching a return switch network connected to the electric motor windings and the power return to a closed state during the first segment of the deceleration period of the electric motor; and
wherein the disconnecting of the electric motor windings from the power return during the second segment of the deceleration period of the electric motor includes:
switching the return switch network to an open state during the second segment of the deceleration period of the electric motor.

5. A storage drive, comprising:
a storage medium adapted to store data therein;
an electric motor adapted to move the storage medium, said electric motor having a plurality of windings;
a power supply having a plurality of winding power outputs, each winding power output being associated with a winding of an electric motor to supply power to the associated winding;
a power return;
a motor controller wherein the motor controller is operable to disconnect the windings of the electric motor from the winding power outputs of the power supply during an entirety of a deceleration period of the electric motor to prevent any flow of a BEMF current into the winding power outputs of the power supply; and
a servo controller in electrical communication with the motor controller and operable to provide a BEMF control signal to the motor controller during the entirety of the deceleration period of the electric motor, wherein the BEMF control signal is representative of a comparison of a desired decelerated velocity profile of the electric motor and an actual decelerated velocity of the electric motor;
wherein the motor controller is further operable to connect at least one winding of the electric motor to the power return during at least a first segment of the deceleration period of the electric motor based on the BEMF control signal, to dissipate any BEMF voltage within the at least one winding of the electric motor; and
wherein the motor controller is further operable to disconnect the electric motor from the power return during a second segment of the deceleration period of the electric motor based on the BEMF control signal.

6. The storage drive of claim 5, further comprising:
a supply switch network connected to the windings of the electric motor and the winding power outputs of the power supply, wherein the disconnecting of the windings of the electric motor from the winding power outputs of the power supply during the entirety of the deceleration period of the electric motor includes:
the motor controller switching the supply switch network to an open state during the entirety of the deceleration period of the electric motor.

7. The storage drive of claim 6,
wherein the supply switch network includes at least one driver switch, each driver switch being connected to one of the at least one winding and the associated winding power output of the power supply; and
wherein the motor controller is in electrical communication with the at least one driver switch and is further operable to open each driver switch during the entirety of the deceleration period of the electric motor to disconnect the electric motor from the power supply.

8. The storage drive of claim 5, further comprising; a return switch network connected to the windings of the electric motor and the power return, wherein the connecting of the at least one winding of the electric motor to the power return during the at least the first segment of the deceleration period of the electric motor includes:
the motor controller switching the return switch network to a closed state during the at least the first segment of the deceleration period of the electric motor.

9. The storage drive of claim 8,
wherein the return switch network includes at least one driver switch, each driver switch being connected to one of the at least one winding and the power return; and
wherein the motor controller is in electrical communication with the at least one driver switch and is further operable to close at least one driver switch during the at least the first segment of the deceleration period of the electric motor to connect the electric motor to the power return.

10. The storage drive of claim 5, further comprising
a return switch network connected to the windings of the electric motor and the power return, wherein the connecting of the at least one winding of the electric motor to the power return during the at least the first segment of the deceleration period of the electric motor includes:
the motor controller switching the return switch network connected to the windings of the electric motor and the power return to a closed state during the first segment of the deceleration period of the electric motor; and
wherein the disconnecting of the windings of the electric motor from the power return during the second segment of the deceleration period of the electric motor includes:
the motor controller switching the return switch network to an open state during the second segment of the deceleration period of the electric motor.

11. The storage drive of claim 10,
wherein the return switch network includes at least one driver switch, each driver switch being connected to one of the at least one winding and the power return;
wherein the motor controller is in electrical communication with the at least one driver switch and is operable to close at least one driver switch during the first segment of the deceleration period of the electric motor to connect the electric motor to the power return; and
wherein the motor controller is in electrical communication with the at least one driver switch and is operable to open each driver switch during the second segment of the deceleration period of the electric motor to disconnect the electric motor from the power return.

12. A storage drive for use with a power supply and a power return, comprising:
a storage medium adapted to store data therein;
an electric motor adapted to move the storage medium;
a motor controller wherein the motor controller is operable to disconnect the electric motor from the power supply during an entirety of a deceleration period of the electric motor to prevent any flow of a BEMF current into the power supply; and wherein the motor controller is further operable to connect the electric motor to the power return during at least a first segment of the deceleration period of the electric motor to dissipate any BEMF voltage within the electric motor; and
a servo controller in electrical communication with the motor controller and operable to provide a BEMF control signal to the motor controller during the entirety of the deceleration period of the electric motor,
wherein the BEMF control signal is representative of a comparison of a desired decelerated velocity profile of the electric motor and an actual decelerated velocity of the electric motor;
wherein the motor controller is operable to connect the electric motor to the power return during the first segment of the deceleration period of the electric motor based on the BEMF control signal; and
wherein the motor controller is operable to disconnect the electric motor from the power return during a second segment of the deceleration period of the electric motor based on the BEMF control signal.

13. The storage drive of claim 12,
wherein the servo controller is operable to toggle the BEMF control line between an active state and an inactive state;
wherein the active state indicates the desired decelerated velocity profile of the electric motor is less than the actual decelerated velocity of the electric motor;
wherein the motor controller is operable to connect the electric motor to the power return based on the BEMF control line being in the active state;
wherein the active state indicates the desired decelerated velocity profile of the electric motor is greater than the actual decelerated velocity of the electric motor; and
wherein the motor controller is operable to disconnect the electric motor from the power return based on the BEMF control line being in the inactive state.

14. An article of manufacture comprising a computer readable storage medium having code executed by a processor for performing operations to reduce a BEMF voltage in a storage drive including an electric motor, the operations comprising:
selectively coupling by a motor controller, a winding power output of a plurality of winding power outputs of a power supply to an associated winding of an electric motor of a storage device during a servo operation period of said electric motor;
disconnecting by the motor controller, all of the windings of the electric motor from all of the winding power outputs of the power supply during an entirety of a deceleration period of the electric motor to prevent any flow of a BEMF current into the winding power outputs of the power supply;
providing by a servo controller in electrical communication with the motor controller, a BEMF control signal to the motor controller during the entirety of the deceleration period of the electric motor, wherein the BEMF control signal is representative of a comparison of a desired decelerated velocity profile of the electric motor and an actual decelerated velocity of the electric motor;
connecting by the motor controller, at least one winding of the electric motor to a power return during at least a first segment of the deceleration period of the electric motor based on the BEMF control signal, to dissipate any BEMF voltage within at least one winding of the electric motor; and
disconnecting by the motor controller, the electric motor from the power return during a second segment of the deceleration period of the electric motor based on the BEMF control signal.

15. The article of manufacture of claim 14, wherein the disconnecting of the electric motor windings from the power supply during the entirety of the deceleration period of the electric motor includes:
switching a supply switch network connected to the electric motor windings and winding power outputs of the power supply to an open state during the entirety of the deceleration period of the electric motor.

16. The article of manufacture of claim 14, wherein the connecting of the at least one windings of the electric motor to the power return during the at least a first segment of the deceleration period of the electric motor includes:
switching a return switch network connected to the electric motor windings and the power return to a closed state during the at least a first segment of the deceleration period of the electric motor.

17. The article of manufacture of claim 14, wherein the connecting of the at least one winding of the electric motor to the power return during the at least a first segment of the deceleration period includes:
switching a return switch network connected to the electric motor windings and the power return to a closed state during the first segment of the deceleration period of the electric motor; and
wherein the disconnecting of the electric motor windings from the power return during the second segment of the deceleration period of the electric motor includes:
switching the return switch network to an open state during the second segment of the deceleration period of the electric motor.

* * * * *